Feb. 4, 1947. J. T. HORECZY 2,415,172
PRODUCTION OF POLYMERS FROM ALCOHOLS USING A BORON
FLUORIDE-ACETIC ACID COMPLEX CATALYST
Filed July 25, 1944
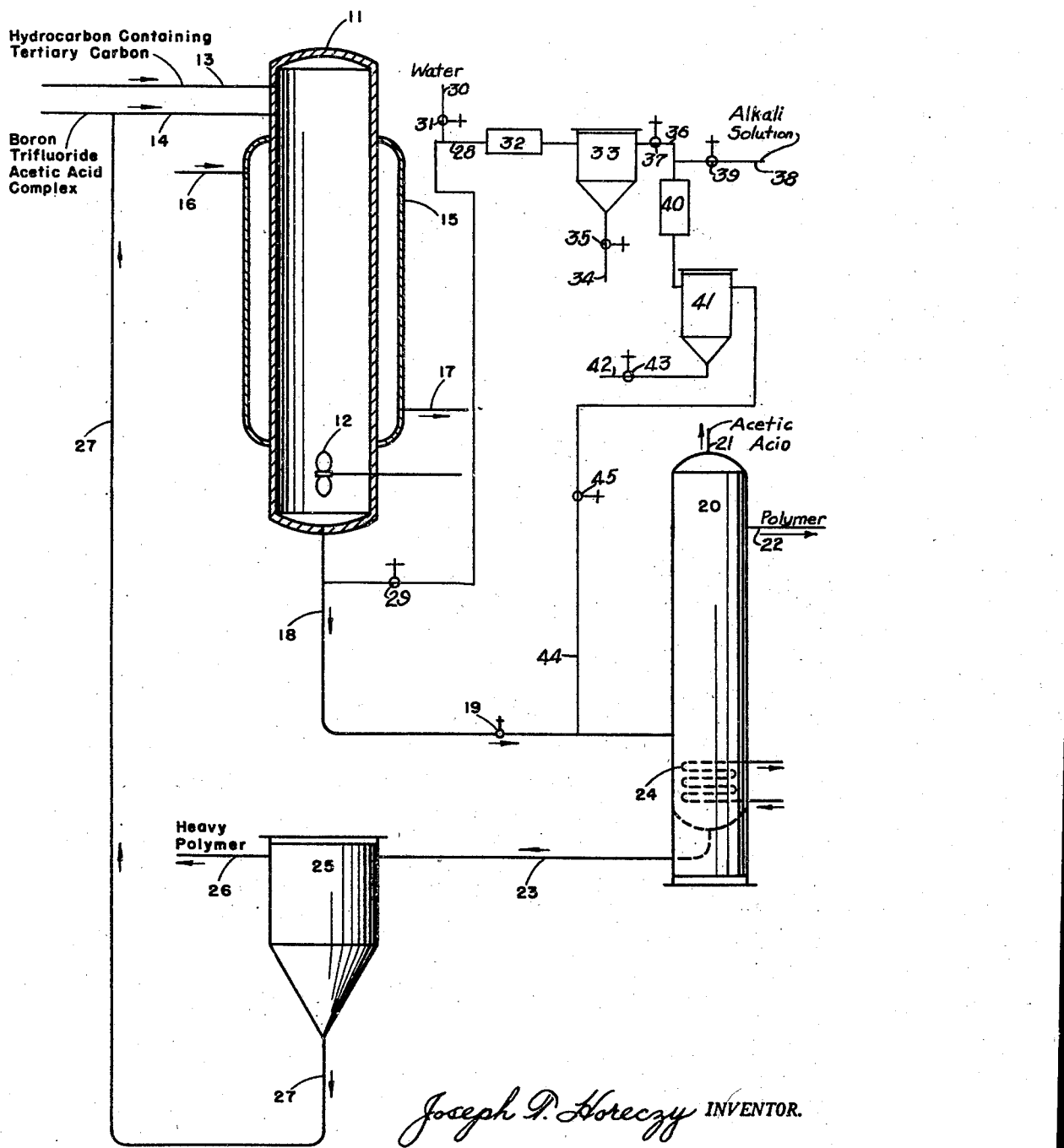

Patented Feb. 4, 1947

2,415,172

UNITED STATES PATENT OFFICE 2,415,172

PRODUCTION OF POLYMERS FROM ALCOHOLS USING A BORON FLUORIDE-ACETIC ACID COMPLEX CATALYST

Joseph T. Horeczy, Baytown, Tex., assignor to Standard Oil Development Company, a corporation of Delaware Application July 25, 1944, Serial No. 546,540

10 Claims. (Cl. 260—683.15)

The present invention is directed to the production of polymers.

In its more specific aspects the present invention is directed to a process for producing polymers having a boiling point lying in the range of safety aviation fuel by treating organic compounds containing a tertiary carbon atom with a catalytic complex.

It is often desirable to obtain an organic compound boiling in the range of 300° to 420° F. and having a high octane number for use as a component in a safety motor fuel, particularly for use in aviation fuel. Appreciable amounts of materials having these characteristics are not present in petroleum, and as a consequence the demands for such materials must be met by synthetic compounds.

I have now discovered an improved process for preparing a hydrocarbon boiling in the range desirable for aviation motor fuels and having a high octane number by polymerizing compounds containing a tertiary carbon atom in the presence of a catalytic complex. This catalytic complex is comprised of boron trifluoride and acetic acid. It is preferred that the complex have boron trifluoride present therein in amounts ranging from 5 to 25 weight per cent of the complex although boron trifluoride may be present in an amount as high as 35 or 40%. This complex may conveniently be formed by dissolving the boron trifluoride in the amounts stated in glacial acetic acid or in an aqueous solution of acetic acid. It may be stated that it is desirable to have no more than 20% of water present in the complex while it is being used in accordance with the reaction of the present invention.

The boron trifluoride-acetic acid complex is suitable for polymerizing a large number of compounds containing a tertiary carbon atom for the production of a higher weight polymer. It has been found particularly suitable, however, for treating compounds containing a tertiary carbon atom selected from the class of tertiary alcohols and tertiary olefins. When producing a polymer for use as a safety aviation fuel, it is desirable to employ either tertiary butyl or tertiary amyl alcohol or isobutylene or isopentylene, or mixtures of the foregoing compounds, as the charging stock. It is desirable to contact the charging stock with the boron trifluoride-acetic acid complex while maintaining both the charging stock and complex in a liquid phase at a temperature above atmospheric but below the boiling point of water. The average interval during which the starting compound and the catalytic complex are in contact may be varied over a substantial range as desired, but usually it will be found desirable to maintain the time of contact within the range of 30 minutes to 2 hours. After the polymer is formed, it may be separated from the boron trifluoride-acetic acid complex and unreacted materials by suitable means, as by distillation, extraction, or a combination of distillation and extraction steps.

A preferred method for practicing the invention will now be described in connection with the drawing, in which the sole figure is in the form of a diagrammatic flow sheet.

Turning now specifically to the drawing, a reactor 11 is provided with a suitable stirring mechanism 12. A charging material containing a tertiary carbon atom is added to the reactor via 13 and a boron trifluoride-acetic acid complex is added by inlet line 14. The vessel is provided with suitable means for maintaining a desirable temperature therein, such as jacket 15, provided with inlet 16 and outlet 17 to allow the circulation of a suitable heating or cooling medium within the jacket.

After the charging material and complex have been maintained within the vessel for a suitable interval to cause the formation of substantial amounts of polymer, the polymerized product may be removed from vessel 11 through outlet 18, controlled by valve 19, and passed to distillation tower 20. Distillation unit 20 may be provided with an outlet 21 for removing an overhead fraction, outlet 22 for removing a side stream, outlet 23 for removing a bottoms fraction, and a suitable heating means such as heating coil 24. The product charged to tower 20 may be fractionated to separate a mixture of unreacted charging stock and acetic acid removed as overhead through line 21 and a polymer removed through the side stream through line 22. The bottoms fraction may be a mixture of heavy polymer and boron trifluoride and acetic acid complex and may be removed through outlet 23 and passed to a separating vessel 25, where it is allowed to settle under the influence of gravity to form a heavy fraction and a lighter fraction. The lighter fraction is a polymer boiling above the desired boiling range and is removed by outlet 26, while the heavier fraction is boron trifluoride and acetic acid complex and may be removed through line 27 and returned to inlet 14 for further use.

By carefully controlling the reaction temperature and the concentration of boron trifluoride in the catalyst, it is possible to suppress formation of hydrocarbons boiling above the desired boiling range, and in these particular instances the desired polymer would be obtained as a bottoms fraction from the tower 20. This total fraction may be segregated as a product or it may be recycled in part back to the reactor 11. It is understood that the portion of fraction withdrawn as a bottoms and not recycled would be treated for recovery of boron trifluoride and acetic acid as described.

If desired, the present invention may be conducted as a batch rather than a continuous operation. In accordance with such a batch operation, a charging material containing a tertiary carbon atom is added to reactor 11 via line 13 and a boron trifluoride-acetic acid complex is added by inlet line 14. After the charging material and complex have been maintained within the reactor vessel for a suitable interval to cause the formation of the polymerized product, instead of withdrawing the product through line 18 and valve 19, valve 19 may remain closed and the product may be withdrawn through branch line 28, controlled by valve 29. Water may be admixed with the polymer product in line 28 by means of line 30, controlled by valve 31. The admixture is then passed through mixing means 32 to insure complete mixing of the water with the product and the mixture is then introduced into separating vessel 33 where it is allowed to settle under the influence of gravity to form an aqueous phase and a hydrocarbon phase. The aqueous phase may be withdrawn through line 34, controlled by valve 35, and the boron trifluoride and acetic acid may be recovered from the aqueous phase by any suitable means, not shown. The hydrocarbon phase may be withdrawn from vessel 33 by line 36, controlled by valve 37.

To remove traces of acidic material from the hydrocarbon phase, an aqueous solution of sodium carbonate or other alkali may be introduced into line 36 via line 38, controlled by valve 39, and the alkaline solution may be intimately mixed with the hydrocarbon phase in mixing means 40. From mixing means 40 the mixture of hydrocarbon and alkali solution is preferably introduced into separating vessel 41 where the alkaline solution is allowed to settle under the influence of gravity and is withdrawn through line 42, controlled by valve 43. The hydrocarbon product may then be withdrawn from vessel 41 through line 44, controlled by valve 45.

As previously explained, if the reaction temperature and the concentration of boron trifluoride in the catalyst has been carefully controlled, the hydrocarbon product may be utilized without distillation. However, it will generally be preferable to introduce the product from line 44 into distillation tower 20 through line 18. Under these conditions any water remaining in the hydrocarbon may conveniently be removed during the distillation.

The following is a specific example illustrating the present invention. Complex consisting of 3 moles of acetic acid with 10 weight per cent of boron trifluoride therein was placed in vessel 11 and to this complex 1 mole of tertiary butyl alcohol was added gradually with 1 hour taken to incorporate the total amount of the butyl alcohol in the complex. The temperature within reactor 11 was maintained within the range of 150° to 160° F. while alcohol was added to the complex, and the contents of the reactor were agitated to insure thorough mixing of the reactants. Shortly after the last tertiary butyl alcohol was added to the reactor the contents of the reactor were washed with water and the insoluble layer separated, washed with sodium carbonate solution and dried. These washing steps removed unreacted alcohol, acetic acid and boron trifluoride, leaving a neutral hydrocarbon layer which was sent to a distillation step. From the distillation step was obtained a medium boiling fraction comprising polymer. The polymer recovered as the medium boiling fraction weighed 51 grams, indicating 91% of the theoretical yield. This fraction had the following physical characteristics:

| | |
|---|---|
| B. P. °F | 300 to 400 |
| d 20/4 | .7588 |
| R. I. $N_D^{20}$ | 1.4300 |
| Br. No | 65 |

As another example, 1 mole of tertiary alcohol was added over a period of 1 hour to a complex comprising 3 moles of acetic acid containing 5 weight per cent of boron trifluoride, with the reaction temperature maintained in the range of 150° to 160° F., as in the preceding example. A 95% yield of product was obtained, with the polymer having a boiling point ranging from 206° to 360° F.

The exact mechanism of the polymerization reaction is not known. As a hypothesis it is suggested that when using a tertiary alcohol as a starting material, the tertiary alcohol is dehydrated to form an olefin and the olefin is polymerized, and that if an olefin is employed as a starting material the reaction is wholly one of polymerization. The following equation is believed to indicate the reaction taking place when butyl alcohol is polymerized in the presence of the complex:

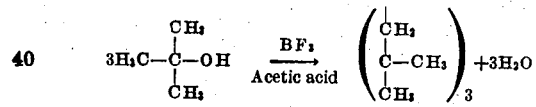

While the above explanation is presented merely as a hypothesis, it is to be noted that the yield of polymer obtained in the practice of the present invention approaches a hundred per cent of the yield theoretically possible when reacting the charging material containing the tertiary carbon atom to form polymer.

Having fully described the present invention, what I desire to claim is:

1. A method for producing hydrocarbons comprising the steps of contacting an aliphatic alcohol containing a tertiary carbon atom with a complex of boron trifluoride and acetic acid and maintaining the compound in contact with the complex for a sufficient interval to form a high boiling point polymer.

2. A method in accordance with claim 1 in which the boron trifluoride in the complex ranges from 5 to 40 weight per cent.

3. A method for producing a high molecular weight hydrocarbon comprising the steps of treating an aliphatic alcohol containing a tertiary carbon atom with a complex comprising boron trifluoride and acetic acid at a temperature of the order of 150° F. and maintaining the charging stock and complex in intimate relation until a high boiling polymer is formed.

4. A method in accordance with claim 3 in which the boron trifluoride comprises from 5 to 35 weight per cent of the complex.

5. A method in accordance with claim 3 in which at least a major portion of the charging stock is tertiary butyl alcohol and in which boron trifluoride comprises approximately 10 weight per cent of the complex.

6. A method in accordance with claim 3 in which the boron trifluoride comprises from 5 to 35 weight per cent of the complex and in which the complex is maintained in contact with the charging stock for an interval ranging from 30 minutes to 2 hours.

7. A method for producing an olefinic hydrocarbon boiling between about 300° F. and 420° F. which comprises the steps of treating tertiary butyl alcohol with a complex comprising boron trifluoride and acetic acid at a temperature of the order of 150° F. and maintaining the charging stock in intimate contact with the complex for a time sufficient to form an olefinic hydrocarbon fraction boiling between 300° F. and 420° F.

8. A method in accordance with claim 7 in which the charging stock and the complex are maintained in contact for a time ranging between 30 minutes and 2 hours.

9. A method in accordance with claim 7 in which the complex comprises no less than 5 weight per cent boron trifluoride.

10. In a method for producing a high boiling hydrocarbon suitable for use in a high octane motor fuel, the steps of forming a complex comprising acetic acid and approximately 10 weight per cent boron trifluoride, maintaining the complex in intimate contact with tertiary butyl alcohol at a temperature of the order of 150° F. for approximately one hour to cause the formation of a high molecular weight polymer, diluting the mixture with water to cause the formation of an aqueous layer and a non-aqueous layer, separating the non-aqueous layer, washing it with sodium carbonate solution and subsequently drying it.

JOSEPH T. HORECZY.

REFERENCES CITED

The following references are of record in the file of this patent:

UNITED STATES PATENTS

| Number | Name | Date |
| --- | --- | --- |
| 2,181,640 | Deanesly | Nov. 28, 1939 |
| 2,182,617 | Michel | Dec. 5, 1939 |
| 2,165,372 | Haag | July 11, 1939 |
| 2,360,632 | Mann | Oct. 17, 1944 |
| 1,989,425 | Otto | Jan. 29, 1935 |
| 2,377,266 | Reid | May 29, 1945 |

FOREIGN PATENTS

| Number | Country | Date |
| --- | --- | --- |
| 793,226 | French | Nov. 16, 1935 |
| 812,909 | French | Feb. 15, 1937 |

OTHER REFERENCES

Meerwein et al. article Journal fur Praktische Chemie, vol. 141, page 123 et seq. (pages 130 to 133 and page 144 pertinent).